US012415263B2

(12) United States Patent
Yang et al.

(10) Patent No.: US 12,415,263 B2
(45) Date of Patent: Sep. 16, 2025

(54) POWER TOOL WITH KNURLED BUSHING

(71) Applicant: MILWAUKEE ELECTRIC TOOL CORPORATION, Brookfield, WI (US)

(72) Inventors: Zhen Bo Yang, Dongguan (CN); Kentez L. Craig, Milwaukee, WI (US); Wei Chao Xu, Dongguan (CN); Zhao Qing Zhang, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/168,933

(22) Filed: Feb. 14, 2023

(65) Prior Publication Data

US 2023/0256580 A1 Aug. 17, 2023

(30) Foreign Application Priority Data

Feb. 14, 2022 (CN) ........................ 202220295729.6

(51) Int. Cl.
*B25F 5/00* (2006.01)
*B25B 21/02* (2006.01)
*B25B 23/18* (2006.01)
*B25F 5/02* (2006.01)

(52) U.S. Cl.
CPC .............. *B25F 5/001* (2013.01); *B25B 21/02* (2013.01); *B25F 5/02* (2013.01); *B25B 23/18* (2013.01)

(58) Field of Classification Search
CPC . B25F 5/001; B25F 5/02; B25B 21/02; B25B 23/18
See application file for complete search history.

(56) References Cited

U.S. PATENT DOCUMENTS

| | | | |
|---|---|---|---|
| 3,270,593 A | 9/1966 | Kaman | |
| 4,213,660 A | 7/1980 | Yasui et al. | |
| 5,704,124 A | 1/1998 | Trauzettel | |
| 2016/0001394 A1* | 1/2016 | Stumpf ............. | B29C 66/12822 228/114.5 |
| 2018/0126538 A1* | 5/2018 | Qiu ...................... | G02B 6/0021 |
| 2020/0023503 A1* | 1/2020 | Malak ..................... | B23P 15/00 |

FOREIGN PATENT DOCUMENTS

| | | |
|---|---|---|
| CN | 112109031 A | 12/2020 |
| DE | 2411907 A1 | 9/1974 |
| DE | 3420665 A1 | 12/1985 |
| EP | 3139071 B1 | 7/2018 |
| WO | 9859403 A1 | 12/1998 |
| WO | 2010115518 A2 | 10/2010 |

OTHER PUBLICATIONS

Extended European Search Report for Application No. 23156317.2 dated Sep. 15, 2023 (8 pages).

* cited by examiner

*Primary Examiner* — Michelle Lopez
(74) *Attorney, Agent, or Firm* — Michael Best & Friedrich LLP

(57) ABSTRACT

A power tool includes a housing, a drive assembly including an output shaft extending from the housing such that a tool element for performing work on a workpiece is attachable to the output shaft, and a bushing rotatably supporting the output shaft. The bushing includes an outer surface having a knurled texture.

19 Claims, 5 Drawing Sheets

POWER TOOL WITH KNURLED BUSHING

CROSS-REFERENCE TO RELATED APPLICATIONS

This application claims priority to Chinese Utility Model Application No. 202220295729.6 filed on Feb. 14, 2022, the entire contents of which are incorporated herein by reference.

FIELD OF THE INVENTION

The present invention relates to power tools, and more specifically to impact tools.

BACKGROUND OF THE INVENTION

Impact tools, such as impact drivers and impact wrenches, are typically utilized to provide a striking rotational force, or intermittent applications of torque, to a tool element or workpiece (e.g., a fastener) to either tighten or loosen the fastener.

SUMMARY OF THE INVENTION

The present invention provides, in one aspect, a power tool including a housing, a drive assembly including an output shaft extending from the housing such that a tool element for performing work on a workpiece is attachable to the output shaft, and a bushing rotatably supporting the output shaft. The bushing includes an outer surface having a knurled texture.

In some embodiments, the bushing is insert-molded within the housing.

In some embodiments, the housing includes a motor housing portion and a gear case coupled to the motor housing portion, and the power tool further comprises a motor supported within the motor housing portion and a gear assembly supported within the gear case.

In some embodiments, the gear case includes a nose at a front end portion of the gear case, and wherein the output shaft extends through a bore in the nose.

In some embodiments, the bushing is positioned within the bore.

In some embodiments, the bore includes a corresponding knurled texture formed by insert molding the bushing within the gear case.

In some embodiments, the power tool includes a light assembly surrounding the nose.

In some embodiments, the light assembly is supported by a holder coupled to the nose, the nose includes a groove, and a retaining ring is received in the groove to retain the holder on the nose.

In some embodiments, the output shaft is an anvil, and the drive assembly further includes a camshaft and a hammer configured to impart consecutive rotational impacts upon the anvil in response to rotation of the camshaft.

In some embodiments, the anvil engages a rear end of the bushing such that the bushing both rotationally and axially supports the anvil.

In some embodiments, the bushing and the gear case are made of different materials.

In some embodiments, bushing is made of AISI 4140 or AISI 52100 steel, and the gear case is made of A380 aluminum.

In some embodiments, the knurled texture comprises a plurality of teeth, each tooth having the shape of a rectangular pyramid.

In some embodiments, each tooth has a height between 0.3 millimeters and 0.7 millimeters.

The present invention provides, in another aspect, a power tool including a housing with a motor housing portion and a gear case coupled to the motor housing portion, a motor supported within the motor housing portion, a gear assembly supported within the gear case and driven by the motor, and a drive assembly driven by the gear assembly. The drive assembly includes an anvil extending from the gear case, a camshaft driven by the gear assembly, and a hammer configured to impart consecutive rotational impacts upon the anvil in response to rotation of the camshaft. The power tool also includes a bushing insert-molded within the gear case. The bushing rotatably and axially supports the anvil.

In some embodiments, an outer surface of the bushing has a knurled texture.

In some embodiments, the knurled texture comprises a plurality of teeth, each tooth having a height between 0.3 millimeters and 0.7 millimeters.

In some embodiments, the bushing includes a cylindrical inner surface rotatably supporting the anvil and a groove formed in the inner surface, the groove retaining a lubricant.

In some embodiments, the housing includes a handle housing portion extending from the motor housing portion, and the handle housing portion includes a battery receptacle configured to receive a battery for powering the motor.

The present invention provides, in another aspect, a power tool including a housing with a motor housing portion and a gear case coupled to the motor housing portion, a motor supported within the motor housing portion, a gear assembly supported within the gear case and driven by the motor, and a drive assembly driven by the gear assembly, the drive assembly including an output shaft extending from the gear case. The power tool also includes a knurled bushing fixed within the gear case, the knurled bushing rotatably and axially supporting the output shaft.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
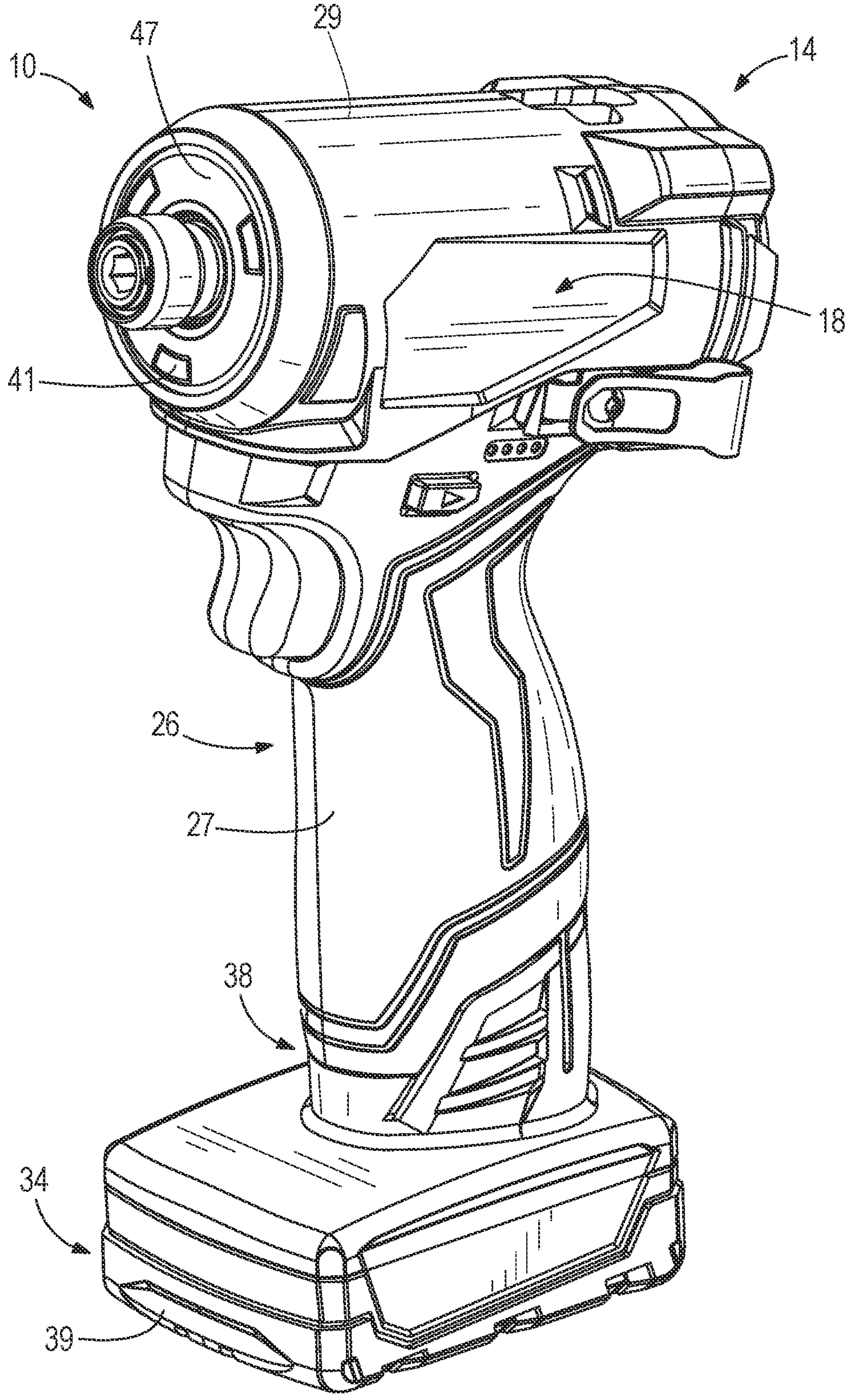
FIG. 1 is a perspective view of an impact tool according to one embodiment.

FIG. 1 illustrates a power tool in the form of a rotary impact tool 10. The impact tool 10 includes a housing 14 with a motor housing portion 18, a front housing portion or gear case 22 (FIGS. 2-4) coupled to the motor housing portion 18 (e.g., by a plurality of fasteners), and a handle portion 26 extending from and disposed below the motor housing portion 18. The handle portion 26 includes a grip 27 that can be grasped by a user operating the impact tool 10.

Figure 2:
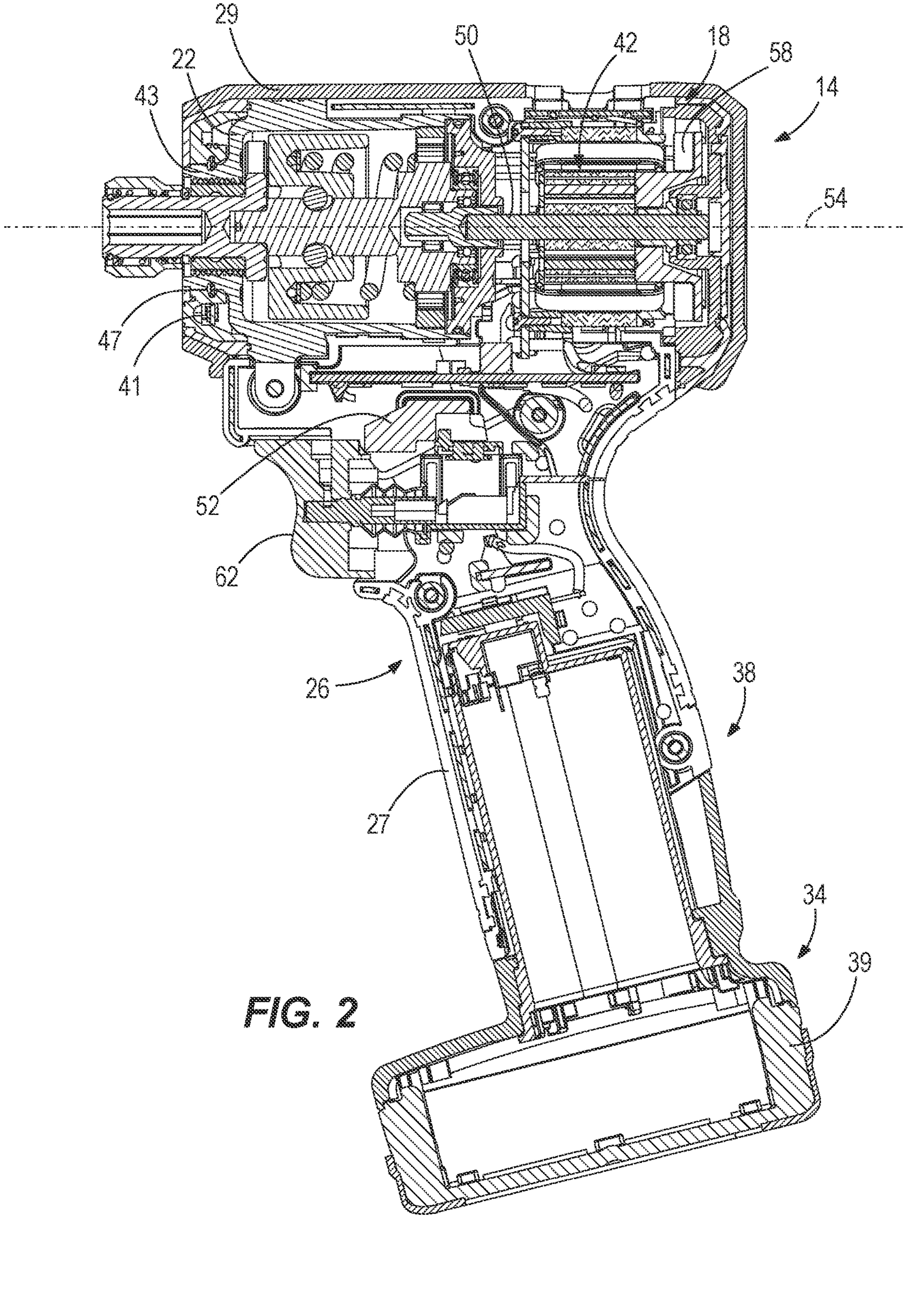
FIG. 2 is a cross-sectional view of the impact tool of FIG. 1.

Referring to FIGS. 1-2, in the illustrated embodiment, the motor housing portion 18 and the handle portion 26 are defined by two cooperating clamshell halves, each molded from a suitable plastic material. The impact tool 10 may also include a protective cover 29, which surrounds and substantially encloses the motor housing portion 18 and the gear case 22. In some embodiments, the cover 29 may be overmolded. In other embodiments, the cover 29 may be attached (and optionally, removably attached) to the motor housing portion 18 and the gear case 22 by a snap fit, a plurality of fasteners, by stretching the cover 29 over the housing 14, or by any other suitable arrangement. The cover 29 is preferably made of a resilient material, such as rubber, to protect the tool 10 from damage if dropped, etc. In other embodiments, the cover 29 may be omitted.

With continued reference to FIGS. 1-2, the impact tool 10 has a battery pack 34 removably coupled to a battery receptacle 38 located at a bottom end of the handle portion 26. The battery pack 34 includes a housing 39 supporting battery cells, which are electrically connected to provide the desired output (e.g., nominal voltage, current capacity, etc.) of the battery pack 34. In other embodiments, the impact tool 10 may include a power cord for electrically connecting the impact tool 10 to a source of AC power. As a further alternative, the impact tool 10 may be configured to operate using a different power source (e.g., a pneumatic power source, etc.).

In the illustrated embodiment, the impact tool 10 includes a light assembly 41 located at a front end of the gear case 22 and surrounding a nose 43 of the gear case 22. The light assembly 41 is supported by a holder 47 coupled to the nose 43 (FIGS. 1-2). In the illustrated embodiment, the holder 47 is at least partially disposed within the cover 29 of the housing 14. The light assembly 41 is oriented so as to illuminate a workpiece during operation of the impact tool 10. The illustrated light assembly 41 includes multiple, circumferentially-spaced light sources (e.g., LEDs), such that the light assembly 41 may advantageously illuminate the workpiece without shadows being created by a tool bit (not shown) attached to the impact tool 10. The holder 47 may include transparent covers/lenses associated with each of the light sources. The light assembly 41 preferably draws power from the battery pack 34 and may automatically illuminate during operation of the impact tool 10 and shut off after a predetermined time period following operation of the impact tool 10.

Figure 3:
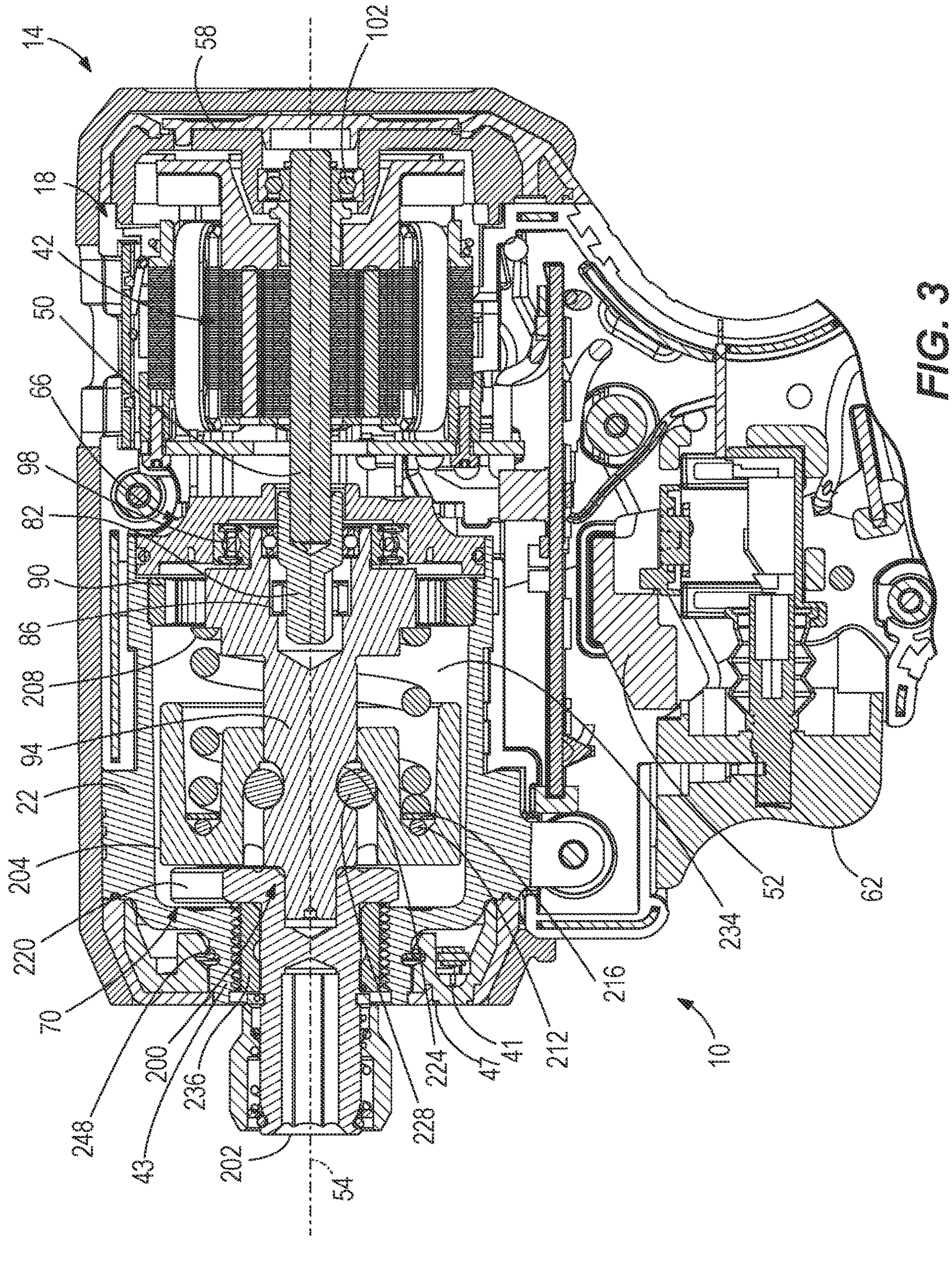
FIG. 3 is an enlarged cross-sectional view of a portion of the impact tool illustrated in FIG. 2.

Referring to FIGS. 2-3, an electric motor 42 is supported within the motor housing portion 18 and receives power from the battery pack 34 when the battery pack 34 is coupled to the battery receptacle 38. The motor 42 is preferably a brushless direct current ("BLDC") motor having a rotor with a motor shaft 50. A button or actuator 52, extending laterally from the housing 14, allows an operator to change the direction in which the motor 42 rotates the motor shaft 50. The motor shaft 50 is rotatable about an axis 54 and is rotatably supported at its rear end portion by a bearing 102 (FIG. 3), which in the illustrated embodiment, is nested within a fan 58. The fan 58 is coupled to the motor shaft 50 for co-rotation therewith (e.g., via a splined connection) behind the motor 42. The impact tool 10 also includes a trigger 62 coupled to the handle portion 26 that is actuatable to energize the motor 42.

With reference to FIG. 3, the impact tool 10 further includes a gear assembly 66 coupled to the motor shaft 50 and a drive assembly or impact assembly 70 coupled to an output of the gear assembly 66. The gear assembly 66 is enclosed within the gear case 22. The illustrated gear assembly 66 includes a pinion 82 coupled to the motor shaft 50, a plurality of planet gears 86 meshed with the pinion 82, and a ring gear 90 meshed with the planet gears 86 and rotationally fixed within the gear case 22. The planet gears 86 are mounted on a camshaft 94 of the drive assembly 70 such that the camshaft 94 acts as a planet carrier. Accordingly, rotation of the motor shaft 50 rotates the planet gears 86, which then orbit along the inner circumference of the ring gear 90 and thereby rotate the camshaft 94 at a reduced speed and increased torque relative to the motor shaft 50. The gear assembly 66 thus provides a gear reduction from the motor shaft 50 to the camshaft 94. In other embodiments, the gear assembly 66 may be configured in any of a number of different ways to provide a gear reduction between the motor shaft 50 and an input of the drive assembly 70.

The drive assembly 70 of the impact tool 10 includes an output shaft in the form of an anvil 200 extending from the gear case 22. The anvil 200 includes a bit holder 202 to which a tool element (e.g., a screwdriver bit; not shown) can be coupled for performing work on a workpiece (e.g., a fastener). The drive assembly 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact tool 10, the drive assembly 70 includes the camshaft 94, a hammer 204 supported on and axially slidable relative to the camshaft 94, and the anvil 200.

In the illustrated embodiment, a rear end portion of the camshaft 94 is rotatably supported by a bearing 98, which in turn is supported by a rear portion of the gear case 22. A front end portion of the camshaft 94 is rotatably supported by the anvil 200 (e.g., the front end portion of the camshaft 94 is sleeved within a bore formed in the rear end of the anvil 200). The anvil 200, in turn, is rotatably supported by a bushing 236, which, as described in greater detail below, is fixed within the nose 43 of the gearcase 22. In the illustrated embodiment, the anvil 200 also engages a rear end of the bushing 236, such that the bushing 236 also supports the anvil 200 in the forward axial direction. In other embodiments, the camshaft 94 and/or the anvil 200 may be supported in other ways. For example, in some embodiments, the anvil 200 may include a boss extending into a bore in the front of the camshaft 94 to rotatably support the anvil 200 and/or the camshaft 94.

The drive assembly 70 further includes a spring 208 biasing the hammer 204 toward the front of the impact tool 10 (i.e., toward the left in FIG. 3). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs (not shown) on the hammer 204 engage with corresponding anvil lugs 220 and rotation of the hammer 204 momentarily stops. The camshaft 94 includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs and the anvil lugs 220 are engaged and the camshaft 94 continues to rotate.

Figure 4:
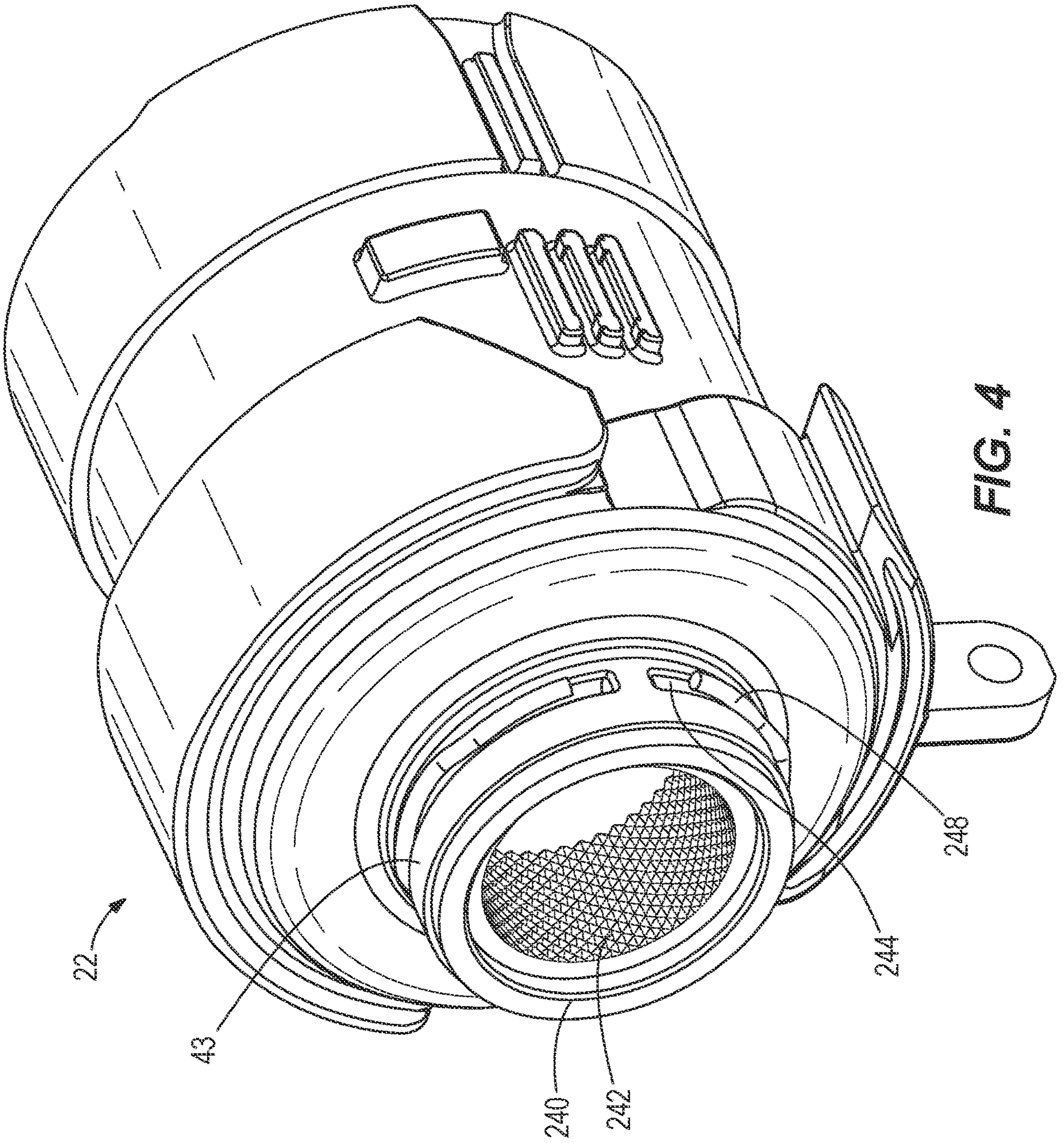
FIG. 4 is a perspective view of a gear case of the impact tool of FIG. 1.
Figure 5B:
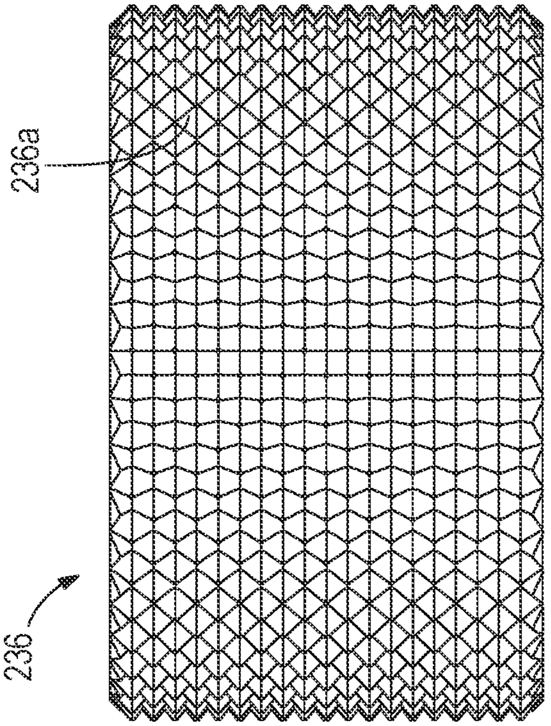
FIG. 5B is a side view of the bushing of FIG. 5A.
Figure 5A:
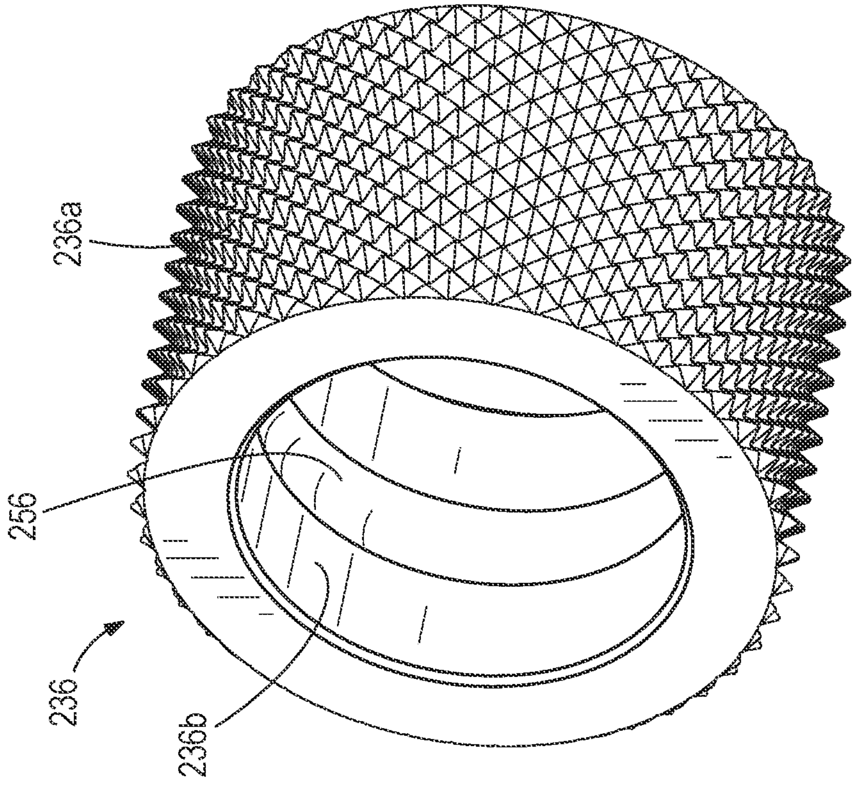
FIG. 5A is a perspective view of a bushing positioned on the gear case of the impact tool of FIG. 1.

With reference to FIGS. 4-5B, the nose 43 of the gear case 22 includes a bore 240 (FIG. 4) that receives the bushing 236 (FIGS. 5A-B). In the illustrated embodiment, an outer surface of the nose 43 includes a groove 244 extending at least partially around a circumference of the nose 43. The groove 244 is shaped and sized to receive a retaining ring 248, such as a c-clip, o-ring, washer, or the like. The retaining ring 248 is configured to engage a corresponding groove on an interior surface of the holder 47 for the light assembly 41, to thereby couple the holder 47 to the nose 43 of the gear case 22 (FIG. 3).

Referring again to FIGS. 5A-B, the bushing 236 is generally cylindrical and includes an outer surface 236*a* having a knurled texture (such that the bushing 236 may be referred to herein as a "knurled bushing"). In the illustrated embodiment, the bushing 236 is insert molded into the nose 43 of the gear case 22, (that is, the gear case 22 is molded around the bushing 236), such that a corresponding knurled texture is formed on an inner mating surface 242 of the gear case 22 (FIG. 4). In other embodiments, the gear case 22 may not include a projecting nose 43 but may instead include a generally flat front end surface, with a thicker portion defining the bore 240 for receiving the bushing 236. As discussed below, the inventors have found that the knurled texture on the inner mating surface 242 of the gear case 22 and the outer surface 236 of the bushing 236 advantageously improves retention of the bushing 236 within the gear case 22, while also reducing stresses on the gear case 22 and improving life cycle durability.

The bushing 236 is preferably made of metal, and more preferably a high-toughness and wear-resistant alloy steel, such as AISI 4140 or AISI 52100 steel. The gear case 22 is preferably made of a metal suitable for molding (e.g., metal injection molding or die casting), such as A380 aluminum. The inventors have found that the combination of these two different materials increase the durability and lifespan of the bushing 236 and the gear case 22. In addition, by forming the gear case 22 from aluminum, the gear case 22 is lighter in weight than if the gear case 22 were formed from steel, for example. In other embodiments, however, other materials and combinations of materials may be used.

The knurled texture of the bushing 236 may comprise a plurality of rectangular pyramidal teeth projecting outwardly from the outer surface 236*a*. In some embodiments, each tooth has a height between 0.3 millimeters and 0.7 millimeters. In some embodiments, the pitch between adjacent teeth is between 1.0 millimeters and 1.5 millimeters. In some embodiments, each tooth has a rounded tip or peak, with a radius between 0.05 and 0.2 millimeters. In other embodiments, the shape, height, and/or pitch of the teeth may vary.

With reference to FIGS. 5A-5B, a cylindrical inner surface 236*b* of the bushing 236 is smooth to provide a bearing surface that rotationally supports the anvil 200. In the illustrated embodiment, the inner surface 236*b* includes a groove 256 extending around an inner circumference of the bushing 236. The groove 256 is positioned at a midpoint along the axial length of the bushing 236 and may be filled with a lubricant, such as grease, to reduce friction between the bushing 236 and the anvil 200. In some embodiments, the bushing 236 may include multiple grooves 256.

Referring to FIGS. 1-3, in operation of the impact tool 10, an operator depresses the trigger 62 to activate the motor 42, which continuously drives the gear assembly 66 and the camshaft 94 via the motor shaft 50. As the camshaft 94 rotates, the cam balls 228 drive the hammer 204 to co-rotate with the camshaft 94, and the hammer lugs engage, respectively, driven surfaces of the anvil lugs 220 to provide an impact and to rotatably drive the anvil 200 and the tool element.

After each impact, the hammer 204 moves or slides rearward along the camshaft 94, away from the anvil 200, so that the hammer lugs disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs disengage the respective anvil lugs 220, the hammer 204 continues to rotate and moves or slides forwardly, toward the anvil 200, as the spring 208 releases its stored energy, until the drive surfaces of the hammer lugs re-engage the driven surfaces of the anvil lugs 220 to cause another impact.

The bushing 236 rotatably supports the anvil 200 and also absorbs forward axial forces exerted on the anvil 200 (e.g., by the hammer 204). The knurled texture on the bushing 236 provides a strong connection between the bushing 236 and the gear case 22 to better resist the forces on the bushing 236. This may improve the stability of the anvil 200 and reduce anvil wobble. In addition, the knurled texture advantageously reduces stress concentrations between the gear case 22 and the bushing 236, as compared to typical bushings, which include a cylindrical outer surface and which may be press-fit into the gear case. Because stress concentrations are reduced, the walls of the gear case 22, particularly at the nose 43 of the gear case and the transition between the nose 43 and the remainder of the gear case, may be made thinner, resulting in both length and weight savings.

Although the bushing 236 is shown incorporated into a rotary impact tool 10, the bushing 236 may alternatively be used with other rotary power tools (e.g., drills, reciprocating saws, rotary hammers, pulse drivers, etc.) for supporting an output spindle or shaft. In such tools, the bushing 236 may substitute for a roller bearing, such as a needle bearing or a ball bearing, which may reduce the cost of the tool without reducing the lifespan of the tool.

Various features of the invention are set forth in the following claims.

What is claimed is:

1. A power tool comprising:

a housing;

a drive assembly including an output shaft extending from the housing such that a tool element for performing work on a workpiece is attachable to the output shaft; and a bushing rotatably supporting the output shaft, wherein the bushing includes an outer surface having a knurled texture, the knurled texture including a plurality of teeth spaced apart along a length and a circumference of the outer surface such that the knurled texture provides a strong connection between the bushing and the housing to resist axial forces on the bushing, and wherein the bushing is insert-molded within the housing.

2. The power tool of claim 1, wherein the housing includes a motor housing portion and a gear case coupled to the motor housing portion, and wherein the power tool further comprises a motor supported within the motor housing portion and a gear assembly supported within the gear case.

3. The power tool of claim 2, wherein the gear case includes a nose at a front end portion of the gear case, and wherein the output shaft extends through a bore in the nose.

4. The power tool of claim 3, wherein the bushing is positioned within the bore.

5. The power tool of claim 4, wherein the bore includes a corresponding knurled texture formed by insert molding the bushing within the gear case.

6. The power tool of claim 3, further comprising a light assembly surrounding the nose.

7. The power tool of claim 6, wherein the light assembly is supported by a holder coupled to the nose, wherein the nose includes a groove, and wherein a retaining ring is received in the groove to retain the holder on the nose.

8. The power tool of claim 2, wherein the output shaft is an anvil, and wherein the drive assembly further includes a camshaft and a hammer configured to impart consecutive rotational impacts upon the anvil in response to rotation of the camshaft.

9. The power tool of claim 8, wherein the anvil engages a rear end of the bushing such that the bushing both rotationally and axially supports the anvil.

10. The power tool of claim 2, wherein the bushing and the gear case are made of different materials.

11. The power tool of claim 10, wherein the bushing is made of AISI 4140 or AISI 52100 steel, and wherein the gear case is made of A380 aluminum.

12. The power tool of claim 1, wherein each tooth of the knurled texture has the shape of a rectangular pyramid.

13. The power tool of claim 12, wherein each tooth has a height between 0.3 millimeters and 0.7 millimeters.

14. A power tool comprising:

a housing including a motor housing portion and a gear case coupled to the motor housing portion;

a motor supported within the motor housing portion;

a gear assembly supported within the gear case and driven by the motor;

a drive assembly driven by the gear assembly, the drive assembly including an anvil extending from the gear case, a camshaft driven by the gear assembly, and a hammer configured to impart consecutive rotational impacts upon the anvil in response to rotation of the camshaft; and a bushing insert-molded within the gear case, the bushing rotatably and axially supporting the anvil, wherein the bushing includes an outer surface and a plurality of teeth spaced apart along a length and a circumference of the outer surface to resist axial forces on the bushing.

15. The power tool of claim 14, wherein the plurality of teeth defines a knurled texture.

16. The power tool of claim 15, wherein the knurled texture comprises a plurality of teeth, each tooth having a height between 0.3 millimeters and 0.7 millimeters.

17. The power tool of claim 15, wherein the housing includes a handle housing portion extending from the motor housing portion, and wherein the handle housing portion includes a battery receptacle configured to receive a battery for powering the motor.

18. The power tool of claim 14, wherein the bushing includes a cylindrical inner surface rotatably supporting the anvil and a groove formed in the inner surface, the groove retaining a lubricant.

19. A power tool comprising:

a housing including a motor housing portion and a gear case coupled to the motor housing portion;

a motor supported within the motor housing portion;

a gear assembly supported within the gear case and driven by the motor;

a drive assembly driven by the gear assembly, the drive assembly including an output shaft extending from the gear case; and a knurled bushing fixed within the gear case, the knurled bushing rotatably and axially supporting the output shaft, wherein the knurled bushing includes a plurality of teeth spaced apart along a length and a circumference of an outer surface of the bushing such that the plurality of teeth provides a strong connection between the bushing and the housing to resist axial forces on the bushing.

* * * * *